United States Patent [19]

Widerstrom

[11] Patent Number: 5,042,765
[45] Date of Patent: Aug. 27, 1991

[54] SELF ADJUSTING SHIM DEVICE

[76] Inventor: Fahey W. Widerstrom, 6200 Marnette, #207A, Houston, Tex. 77036

[21] Appl. No.: 547,166

[22] Filed: Jul. 2, 1990

[51] Int. Cl.⁵ ............................................. F16M 11/24
[52] U.S. Cl. .................................. 248/188.3; 248/631
[58] Field of Search ............... 248/618, 619, 621, 631, 248/188.2, 188.2, 649; 297/216

[56] References Cited

U.S. PATENT DOCUMENTS

| | | | |
|---|---|---|---|
| 2,076,071 | 4/1937 | DeBolt | 248/631 |
| 2,541,851 | 2/1951 | Wright | 273/58 J X |
| 2,704,663 | 3/1955 | Blake | 248/188.2 X |
| 3,045,390 | 7/1962 | Tao | 248/188.3 |
| 3,155,357 | 11/1964 | Kramcsak et al. | 248/188.3 |
| 3,244,382 | 4/1966 | Blake | 242/107.4 |
| 3,351,027 | 11/1967 | Ellard et al. | 248/631 X |
| 3,382,511 | 5/1968 | Brooks | 5/355 |
| 3,606,463 | 9/1971 | Brooks | 297/455 |
| 3,827,663 | 8/1974 | Hinman | 248/188.3 |
| 3,871,496 | 3/1975 | Wigal | 188/268 |
| 4,798,359 | 1/1989 | Ball | 248/188.3 |

FOREIGN PATENT DOCUMENTS 688623 6/1964 Canada ............................. 248/188.3

Primary Examiner—Carl D. Friedman
Assistant Examiner—Derek J. Berger
Attorney, Agent, or Firm—Kenneth A. Roddy

[57] ABSTRACT

A self adjusting shim device has an elastic outer bladder formed of resilient material filled ith bouncing putty. The bouncing putty filler will deform slowly under the slightest force like a highly viscous liquid but will resist rapidly applied loads as if it were a solid. The shim device is placed between the bottom of an article, such as one or more legs of a piece of furniture, and the weight of the article supported on the shim device will, in a short time, cause the shim device(s) to deform and the article supported will assume a state of equilibrium, even if the legs are of unequal length. A sudden downward force applied to the supported article will create a compressive force on the resilient bladder causing the bouncing putty filler to become rigid and resist the downward force. When the downward force is lessened or removed, the bladder tends to return to its original shape. In another embodiment, the elastic bladder is contained within a pair of opposed rigid cup-shape members telescopically joined together and adapted to be installed on the bottom of articles.

9 Claims, 1 Drawing Sheet

SELF ADJUSTING SHIM DEVICE

BACKGROUND OF THE INVENTION

1. Field of the Invention

This invention relates generally to shim devices, and more particularly to a shim device having a resilient envelope enclosing a viscous putty material.

2. Brief Description of the Prior Art

Very often, objects such a tables and chairs are supported on an uneven surface, or they have legs of different lengths which causes them to suddenly tilt. Furniture is often chocked with various objects, such as leveling screws, folded paper, bottle caps, and other miscellaneous material at hand. Although these objects may work for a limited time, they are unsightly and undesirable. Others have devised complicate mechanisms in an attempt to solve this problem. There are several patents which disclose various furniture leveling devices and other mechanical devices utilizing bouncing putty.

Hinman, U.S. Pat. No. 3,827,663 discloses a self adjusting furniture support comprising a foot member spring biased in a downward direction along a rectilinear guideway extending at an angle from the horizontal plane.

Ball, U.S. Pat. No. 4,798,359 discloses a self adjusting furniture glide having an upper body rotatably mounted to a lower foot piece having an arcuate ramp surface on which a complimentary ramp surface of the upper body rests, and a coil spring mounted between the foot and upper body to downwardly bias the foot piece and to apply a torque which opposes mutual rotation of the pieces.

Blake, U.S. Pat. No. 3,244,382 discloses an apparatus for resisting a sudden pull in one direction on a flexible member comprising a housing, a drum on which the flexible member is wound, first and second rotatable elements mounted in the housing and arranged to engage bouncing putty located between them. The bouncing putty is put in shear when the elements rotate relative to one another. When a predetermined rate of relative movement is reached, the resistance to shear of the bouncing putty is increased and the elements tend to rotate together.

Brooks, U.S. Pat. No. 3,382,511 discloses a safety cushion having a rigid bottom wall, rigid side walls extending upwardly from the bottom, and a mass of bouncing putty occupying the entire space between the bottom and side walls. The bouncing putty filled cushion provides a custom fit for the user and but becomes rigid and unyielding under a rapidly applied load.

Brooks, U.S. Pat. No. 3,606,463 discloses a vehicular seating system comprising a rigid backing member and a cellular cushion of elastomeric material having a plurality of voids which are filled with bouncing putty resiliently contained therein by the elastomeric material. The original configuration of the seating system is maintained by the elasticity of the cushion and is rendered substantially rigid during sudden acceleration.

Wigal, U.S. Pat. No. 3,871,496 discloses a rate controlling device which is attached to a moving element for controlling the rate of motion of the moving element. Bouncing putty is enclosed in a flexible envelope and force is applied thereto substantially equal to the driving force applied to the moving element. When the moving element is speeded up, the resistance applied by the flexible envelope increases greater than proportionally to the force exerted thereon due to the properties of the bouncing putty.

The present invention is distinguished over the prior art in general, and these patents in particular by a self adjusting shim device having a elastic outer bladder formed of resilient material filled with bouncing putty. The bouncing putty filler will deform slowly under the slightest force like a highly viscous liquid but will resist rapidly applied loads as if it were a solid. The shim device is placed between the bottom of and article, such as one or more legs of a piece of furniture, and the weight of the article supported on the shim device will, in a short time, cause the shim device(s) to deform and the article supported will assume a state of equilibrium, even if the legs are of unequal length. A sudden downward force applied to the supported article will create a compressive force on the resilient bladder causing the bouncing putty filler to become rigid and resist the downward force. When the downward force is lessened or removed, the bladder tends to return to its original shape. In another embodiment, the elastic bladder is contained within a pair of opposed rigid cup-shaped members telescopically joined together and adapted to be installed on the bottom of articles. The self adjusting shim device substantially reduces or eliminates the tilting or wobbling action of the articles under which it is placed and will compensate for the unevenness of floors or legs of unequal length. They may also be applied to heavy machinery and washing machines, etc., to reduce vibration and their tendency to "walk" when in operation.

SUMMARY OF THE INVENTION

It is therefore an object of the present invention to provide a self adjusting shim device which has a combination of the properties of both a liquid and a solid allowing it to deform slowly to fill the gap between an article and the surface upon which it is supported and which will resist rapidly applied loads as if it were a solid.

It is another object of this invention to provide a self adjusting shim device having a resilient outer bladder having a memory which is filled with a viscous solid elastic material.

Another object of this invention to provide a self adjusting shim device having a resilient outer bladder having a memory which is filled with a viscous solid elastic material and contained within a rigid telescoping container.

Another object of this invention is to provide a self adjusting shim device which is easily and quickly installed between the legs of furniture and the like to prevent tilting of the supported article due to uneven floors or legs of unequal length.

Another object of this invention is to provide a self adjusting shim device which can be installed beneath heavy machinery, washing machines, and other appliances to reduce their vibration and tendency to "walk" when in operation.

A further object of this invention is to provide a self adjusting shim device which may be used as packing elements or for shoring various article or containers of substances which will allow slow or gentle movement of objects, but would not allow rapid motions.

A still further object of this invention is to provide a self adjusting shim device which is simple in construction, economical to manufacture, and rugged and reliable in use.

Other objects of the invention will become apparent from time to time throughout the specification and claims as hereinafter related.

The above noted objects and other objects of the invention are accomplished by a self adjusting shim device having an elastic outer bladder formed of resilient material filled with bouncing putty. The bouncing putty filler will deform slowly under the slightest force like a highly viscous liquid but will resist rapidly applied loads as if it were a solid. The shim device is placed between the bottom of and article, such as one or more legs of a piece of furniture, and the weight of the article supported on the shim device will, in a short time, cause the shim device(s) to deform and the article supported will assume a state of equilibrium, even if the legs are of unequal length. A sudden downward force applied to the supported article will create a compressive force on the resilient bladder causing the bouncing putty filler to become rigid and resist the downward force. When the downward force is lessened or removed, the bladder tends to return to its original shape. In another embodiment the elastic bladder is contained within a pair of opposed rigid cup-shaped members telescopically joined together and adapted to be installed on the bottom of articles. The self adjusting shim device substantially reduces or eliminates the tilting or wobbling action of the articles under which it is placed and will compensate for the unevenness of floors or legs of unequal length. They may also be applied to heavy machinery and washing machines, etc., to reduce vibration and their tendency to "walk" when in operation.

DESCRIPTION OF THE PREFERRED EMBODIMENT

Figure 1:
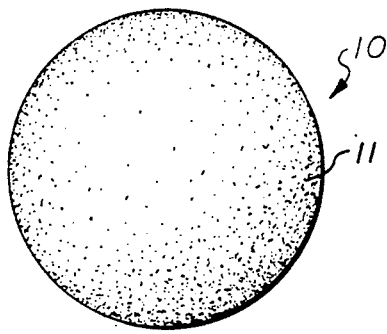
FIG. 1 is a side elevation of a self adjusting shim device in accordance with the present invention.
Figure 2:
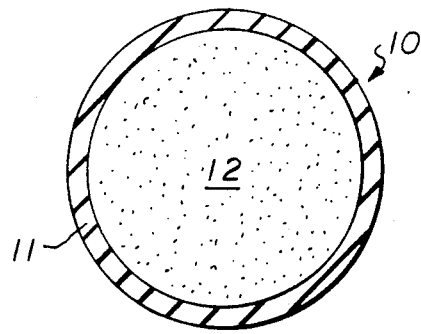
FIG. 2 is a cross section view of the self adjusting shim device of FIG. 1.

Referring to the drawings by numerals of reference, there is shown in FIGS. 1-4, a preferred self adjusting shim device 10. The shim device 10 comprises an outer bladder 11 formed of suitable non-permeable elastic or resilient material having a memory, such as rubber. The outer bladder 11 is illustrated as a sphere or ball, but it should be understood that other shapes may be used.

The interior of the outer bladder 11 is filled with a substance known as "bouncing putty" 12. Bouncing putty is a solid elastic product of a reaction between a silicon oil and a compound of boron such as, for example, boric acid with the addition of a filler, such as lithopone. The bouncing putty has a combination of the properties of both a liquid and a solid. It will deform slowly under the slightest force like a highly viscous liquid limited by its container (outer resilient bladder 11). On the other hand, the bouncing putty 12 will resist rapidly applied loads as if it were a solid.

Figure 3:
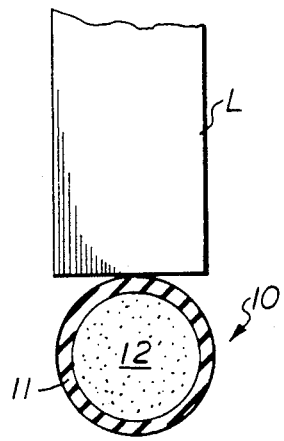
FIG. 3 is a cross section view of the self adjusting shim device of FIG. 1 placed under the leg of an article.
Figure 4:
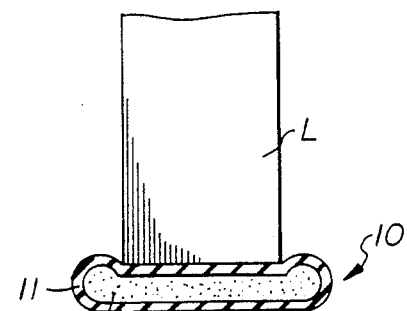
FIG. 4 is a cross section view the self adjusting shim device of FIG. 1, in a distended condition.
Figure 5:
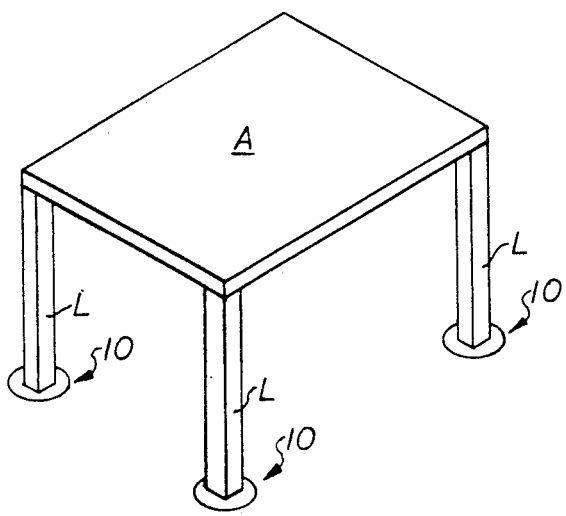
FIG. 5 is an isometric view of a plurality of the self adjusting shim devices of FIG. 1 placed under the legs of an article.

As seen in FIGS. 3, 4, and 5, if one or more of the self adjusting shim devices 10 are placed between the bottom of a leg L of a piece of furniture such as a table or chair, the weight of the article A supported on the shim device 10 will, in a short time, cause the shim device(s) 10 to deform and the article supported will assume a state of equilibrium, even if the legs are of unequal length. If a sudden downward force is applied to the supported article, the leg of the article will cause a compressive force on the resilient bladder 11 which is resisted by the action of the bouncing putty 12 inside the bladder, since the bouncing putty becomes rigid when subjected to a sudden force.

Because the bouncing putty 12 is sealed within the non-permeable elastic or resilient bladder 11 which has a memory, the resiliency of the bladder allows it to deform and the bouncing putty 12 contained inside the bladder will also deform as would a fluid when compressed. If the weight or force is removed or lessened from the shim device 10, the bladder 11 and the bouncing putty 12 would attempt to return to its original shape. In either the compression (deformed) or decompression (non-deformed) state, the bouncing putty 12 will become rigid if a force is suddenly applied, and the action would be described as "anti-shock absorbing".

The bladder 11 is of sufficient resiliency to apply a steady continuous pressure on the bouncing putty 12 to deform the bouncing putty when the weight or force is slowly removed from the bladder as the bladder slowly resumes its original configuration, but will apply rapid compressive pressure on the bouncing putty when the weight or force thereon is suddenly decreased to cause the bouncing putty to become rigid and unyielding. Because the bladder tends to return to its original configuration, the shim device will automatically adjust to fill the gap between an article and the surface upon which it is supported.

Figure 6:
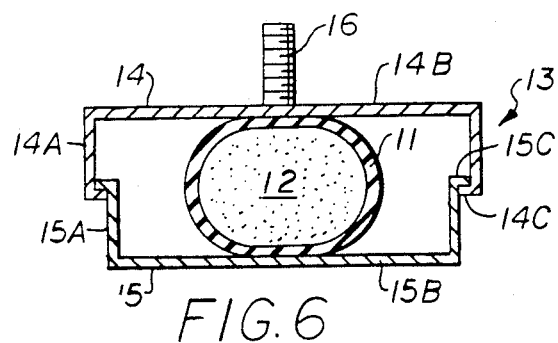
FIG. 6 is a cross section view of another embodiment of the self adjusting shim device in accordance with the present invention.

As seen in FIG. 6, the bladders 11 containing the bouncing putty may be contained within a collapsible or bellows type rigid outer housing. In the illustrated example, the outer housing 13 comprises an upper 14 and lower 15 cup-shaped member slidably and telescopically joined together in opposed relation. The upper cup-shaped member 14 and lower cup-shaped member 15 each have a side wall 14A, 15A and an end wall 14B, 15B, respectively. The upper cup-shaped member 14 has a threaded shank or rod 16 extending upwardly from its end wall 14B. The overlapping side walls 14A and 15A of the cup-shaped members are provided with radial flanges 14C and 15C, respectively, to prevent them from becoming disengaged but allowing telescoping movement. The self adjusting shim device 10 (the bladder 11 containing bouncing putty 12) is contained within the opposed cup-shaped members 14 and 15. The outer housing 13 may be installed on the bottom of an object, such as a table or chair leg by means of the threaded rod 16.

Although the shim device is shown installed on the bottom of an object by means of a threaded rod, it should be understood that any other suitable means may be employed, such as nails, glue, or any other suitable fastener.

Figure 7:
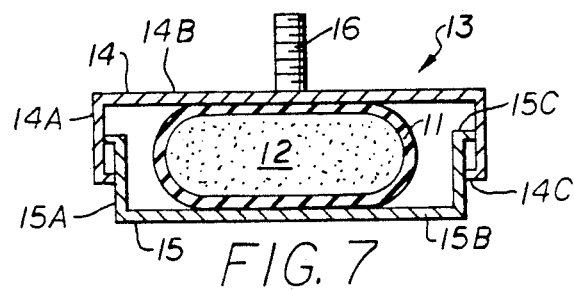
FIG. 7 is a cross section view of the shim device of FIG. 6 in a compressed condition.

As seen in FIG. 7, with the embodiment of FIG. 6, the weight of the article supported on the shim device will, in a short time, cause the cup-shaped members 14 and 15 to move telescopically together which will deform the bladder 11 and bouncing putty 12 therein and the article supported will assume a state of equilibrium, even if the legs are of unequal length. If a sudden downward force is applied to the supported article, the leg of the article will cause a compressive force on the cup-shaped members which would be resisted by the action of the bouncing putty inside the bladder.

Although the preferred shim device has the bouncing putty enclosed inside a bladder, it should be understood that other configurations may be possible. For example, the bouncing putty may be contained within an open top rigid container, such as a cup-shaped, or box-like container. The container may be placed beneath one or more legs of a table or chair with the bottom of the leg in direct contact with the bouncing putty.

Thus, it can be understood that the self adjusting shim devices of the present invention when applied to articles of furniture and the like will substantially reduce or eliminate the annoying tilting or wobbling action of the articles and will prevent spilling of liquids from containers supported on the article. The present devices will also lessen the startling feeling of falling from a tilting chair.

The shim devices will compensate for the unevenness of floors and allow articles of furniture be moved to different locations, as they would be self adjusting.

The self adjusting shim devices can also be applied to heavy machinery and washing machines, etc., to reduce their vibration and tendency to "walk" when in operation.

The present self adjusting shim device may also be used as packing elements or for shoring various article or containers of substances since they allow slow or gentle movement of objects, but would not allow rapid motions.

While this invention has been described fully and completely with special emphasis upon a preferred embodiment, it should be understood that within the scope of the appended claims the invention may be practiced otherwise than as specifically described herein.

I claim:

1. A self adjusting shim device comprising;
   an elastic resilient container member configured to be placed on the bottom of an article for supporting the article on a surface and sufficiently resilient to tend to resume its original configuration when the weight supported thereon is lessened to compensate for differences in distance between the bottom of the article and the supporting surface, and
   a mass of highly viscous putty-like filler material contained within said container member and having the properties of being elastic and deformable under a steady continuous pressure but becoming rigid and substantially unyielding under a rapidly applied load,
   said container sufficiently resilient to apply a steady continuous pressure on said filler material to deform said filler material as said container slowly resumes its original configuration when the weight supported thereon is slowly lessened but will apply rapid compressive pressure on said filler material when the weight supported thereon is suddenly increased or decreased to cause said filler material to become rigid and unyielding, and
   the weight of the article supported on said container causes said container to apply a steady continuous pressure on said filler material whereby the deformation of said filler material allows the supported article to assume a state of equilibrium between the downward force of the weight of the article and the resistive force of the supporting surface.

2. A self adjusting shim device according to claim 1 wherein
   said filler material is bouncing putty.

3. A self adjusting shim device according to claim 1 wherein
   said filler material comprises a solid elastic product of a reaction between a silicon oil and a compound of boron with the addition of a filler.

4. A self adjusting shim device according to claim 3 wherein
   said compound of boron is boric acid, and
   said filler is lithopone.

5. A self adjusting shim device comprising;
   a pair of opposed cup-shaped members slidably and telescopically joined together and each having a side wall and an end wall and configured to be placed on the bottom of an article for supporting an article on a surface,
   an elastic resilient enclosure member contained within said cup-shaped members and sufficiently resilient to tend to resume its original configuration when the weight supported thereon is lessened to compensate for differences in distance between the bottom of the article and the supporting surface, and
   a mass of highly viscous putty-like filler material contained within said enclosure member and having the properties of being elastic and deformable under a steady continuous pressure but becoming rigid and substantially unyielding under a rapidly applied load,
   said container sufficiently resilient to apply a steady continuous pressure on said filler material to deform said filler material as said container slowly resumes its original configuration when the weight supported thereon is slowly lessened but will apply rapid compressive pressure on said filler material when the weight supported thereon is suddenly increased or decreased to cause said filler material to become rigid and unyielding, and
   the weight of the article supported on said cup-shaped members caused said resilient enclosure member to apply a steady continuous pressure on said filler material whereby the slow deformation of said filler material allows the supported article to assume a state of equilibrium between the downward force of the weight of the article and the resistive force of the supporting surface.

6. A self adjusting shim device according to claim 5 in which
   one said cup-shaped member has engagement means thereon for engaging the bottom surface of an article supported on the support surface.

7. A self adjusting shim device according to claim 5 wherein
   said filler material is bouncing putty.

8. A self adjusting shim device according to claim 5 wherein
   said filler material comprises a solid elastic product of a reaction between a silicon oil and a compound of boron with the addition of a filler.

9. A self adjusting shim device according to claim 8 wherein
   said compound of boron is boric acid, and
   said filler is lithopone.

* * * * *